United States Patent [19]
Woodmansee et al.

[11] Patent Number: 5,514,218
[45] Date of Patent: May 7, 1996

[54] SOIL WASHING PROCESS USING POLYMERIC SORBENTS

[75] Inventors: Donald E. Woodmansee, Schenectady; Youssef El-Shoubary, Clifton Park, both of N.Y.

[73] Assignee: General Electric Company, Schenectady, N.Y.

[21] Appl. No.: 317,054

[22] Filed: Oct. 3, 1994

[51] Int. Cl.$^6$ ................................. B08B 7/00; B08B 7/04
[52] U.S. Cl. ...................... 134/7; 134/6; 134/10; 134/13; 134/40
[58] Field of Search ................... 134/1, 6, 7, 10, 134/13, 40; 210/638, 690, 704, 705, 908, 909, 671

[56] References Cited

U.S. PATENT DOCUMENTS

| | | | |
|---|---|---|---|
| 3,215,623 | 11/1965 | Hix | 210/24 |
| 3,567,660 | 3/1971 | Winkler | 260/2.3 |
| 3,916,072 | 10/1975 | Hausch et al. | 428/423 |
| 4,526,677 | 7/1985 | Grantham et al. | 208/262 |
| 4,764,282 | 8/1988 | Snyder | 210/690 |
| 4,783,263 | 11/1988 | Trost et al. | 210/638 |
| 4,857,221 | 8/1989 | Brookes et al. | 252/61 |
| 5,002,829 | 3/1991 | Shibahara | 428/409 |

*Primary Examiner*—Jan H. Silbaugh
*Assistant Examiner*—Robin S. Gray
*Attorney, Agent, or Firm*—Paul R. Webb, II

[57] ABSTRACT

Contaminated material is decontaminated using a process in which fractions of the contaminated material are sequentially exposed to a polymeric sorbent to enhance removal of contaminants. The contaminated material is first converted into a slurry which may be divided into a sand slurry and a slimes slurry. A quantity of large polymeric sorbent particles are first contacted with the slimes slurry and then separated and contacted with the sand slurry. The sorbent particles are then separated from the sand slurry which is exposed to the action of a flotation cell. The concentrate removed from the flotation cell is then exposed to the polymeric sorbent particles. At least a portion of the sorbent particles are then thermally regenerated and recycled. One preferred material for the polymeric sorbent is nitrile-butadiene rubber.

6 Claims, 2 Drawing Sheets

SOIL WASHING PROCESS USING POLYMERIC SORBENTS

BACKGROUND OF THE INVENTION

This invention relates generally to removing contaminants such as PCBs from soil and more particularly to using large rubber particles to enhance contaminant removal.

Hazardous waste sites are drawing increasing attention and concern, and the need to clean up such areas is becoming more and more apparent. Traditional cleanup operations are, however, very costly as well as technically difficult. They often involve the transportation of large volumes of contaminated materials to specially designated and/or designed dump areas that require perpetual maintenance. This transportation of large volumes of contaminated materials, often over relatively long distances, is usually one of the most significant cost factors in cleanup operations of this kind. Moreover, equally large volumes of uncontaminated materials such as soils are often brought from distant locations to refill the cleanup site.

Local incineration and in situ cleanup processes are the most common alternative cleanup methods. However, the fuel costs of incineration are quite large. Incineration may also lead to air pollution problems which are sometimes even more pernicious than the original soil contamination problem being addressed. In situ cleanup operations, which usually involve the injection of solvents into the ground and then the extraction of the resulting solvent/contaminant solution, require extensive drilling and sampling. Very large volumes of expensive solvents and/or water are required by such in situ methods. In situ cleanup methods are inconclusive because it is very difficult to assure the completeness of the cleanup. Portions of a contaminated area can thus be missed. Moreover, solvents can be lost in fissures in the earth and can escape to previously uncontaminated areas where the solvents themselves become contaminants. Solvent containment problems are often dealt with by isolating the contaminated area from adjacent uncontaminated areas using walls and screens of one kind or another. However, the cost of constructing these barriers often becomes prohibitive.

An alternative to in situ methods is ex situ methods in which the contaminated material is excavated, treated, tested and then put back in the same location. Although the excavation cost is of concern, ex situ methods avoid the problems of extensive drilling and sampling, incomplete results and secondary contamination. Soil washing is one promising ex situ method for treating contaminated soils. The process typically consists of first screening the excavated soil and then separating fine particles (10–15 microns) from the soil using a hydroclone. The remaining soil fractions undergo attrition scrubbing to liberate the contaminants. A flotation cell is used to remove the liberated contaminants from the soil slurry. The contaminant is collected in the froth, while the cleansed soil is collected as the tails.

Surfactants are commonly added to the flotation cell to facilitate collection of the contaminants. However, the surfactants generally cannot be separated from the soil for reuse or recycle. In addition, many surfactants are designed to produce a strong froth to enable the flotation separation. The froth must be controlled to prevent spillage. Another way to facilitate contaminant collection is to add adsorbent materials such as powdered or granular carbon. While such adsorbent materials are typically capable of being recycled, the separation of these adsorbent materials from the soil is a time consuming and costly process.

Accordingly, there is a need for a soil washing process which has enhanced contaminant collection without using materials that are not easily separated and recycled.

SUMMARY OF THE INVENTION

The above-mentioned needs are met by the present invention which provides a process for removing contaminants from a contaminated material. The process begins by converting the contaminated material into a slurry and dividing that slurry into a sand slurry and a slimes slurry by hydrocloning. Then, the sand slurry is agitated while the slimes slurry is exposed to a polymeric sorbent. After a first time period, the polymeric sorbent is separated from the slimes slurry and added to the sand slurry. The sand slurry and polymeric sorbent are stirred and then separated after a second time period. Next, the sand slurry is exposed to the action of a flotation cell. The concentrate removed from the flotation cell is then exposed to the polymeric sorbent separated from the sand slurry. After a third time period, the polymeric sorbent is separated from the concentrate. At least a portion of the polymeric sorbent is then thermally regenerated and reused for another cycle. The regeneration is done by exposing the polymeric sorbent to a temperature in the range of about 130–150° C. for about 5–10 minutes.

The polymeric sorbent is provided in the form of a number of particles which are larger than soil particles. The mass ratio of the polymeric sorbent particles to the contaminated material in the initial slurry is preferably in the range of about 3–10%. One preferred material for the polymeric sorbent is nitrile-butadiene rubber.

Other objects and advantages of the present invention will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
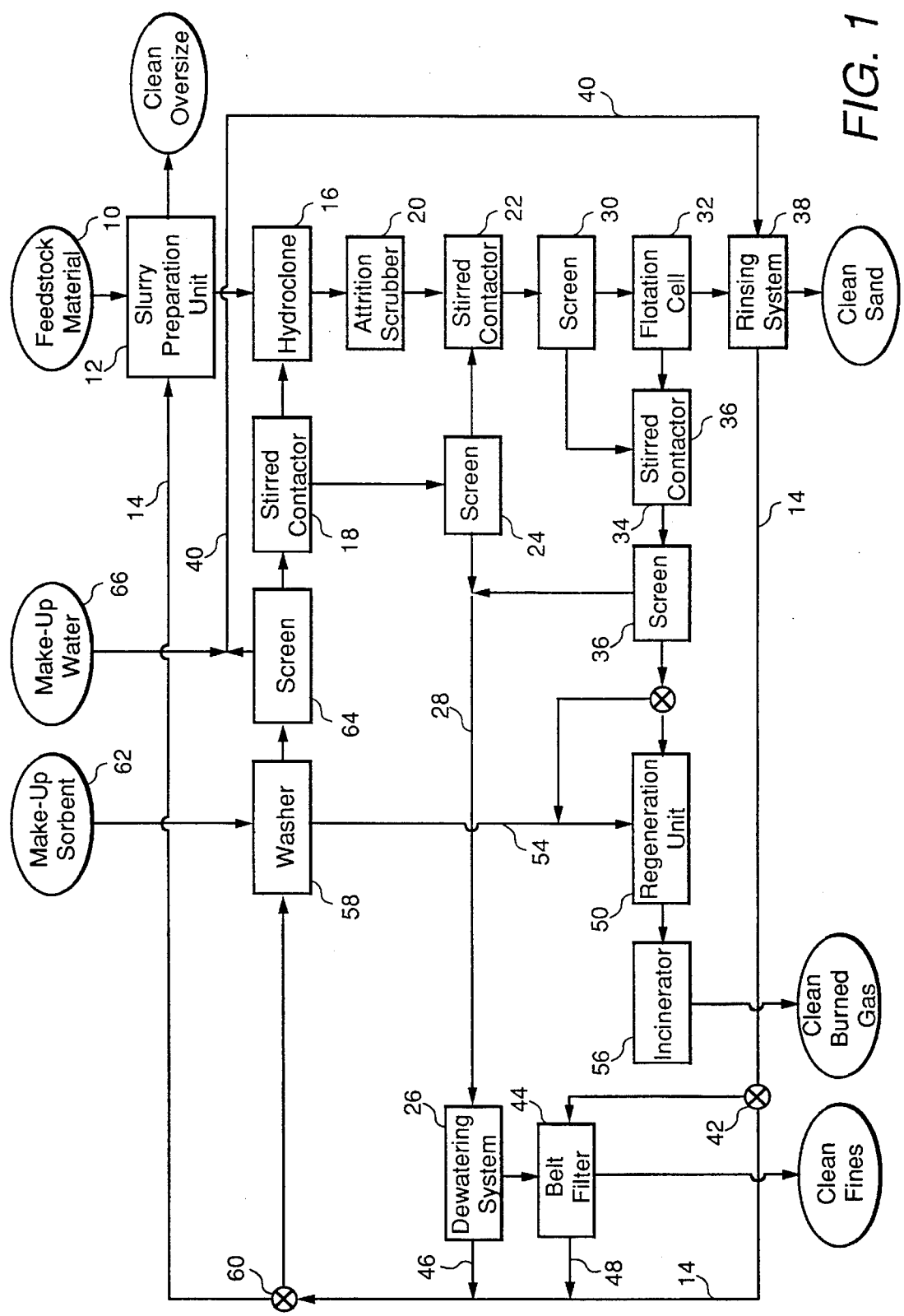
FIG. 1 is a block diagram of a soil washing system in accordance with the present invention.

Referring to FIG. 1, the soil washing system of the present invention is shown wherein soil or other material contaminated with contaminants such as PCBs can be treated in a continuous cycle. As used herein, the term "contaminant" refers to toxic, hazardous or otherwise undesirable material. While the removal of PCBs is of prime concern, the present invention is also capable of removing many other contaminants. Moreover, the present invention is not limited to the treatment of soils, but is also applicable to other materials such as sludges, sediments, rock, aqueous streams and the like.

In the present invention, contaminated feedstock material 10 such as excavated soil is initially fed to a slurry preparation unit 12 wherein the feedstock material 10 undergoes initial handling steps such as screening and crushing. Generally, the slurry preparation unit 12 includes a screen capable of separating oversize or coarse material (e.g., particles above 4 mm, trash, rocks, tree limbs, etc.) which is typically not contaminated from the fine material which is contaminated. The clean coarse material is discharged from the soil washing system as further cleaning is not required. It should be noted that some contaminated feedstock material 10 will not need such initial process steps. In any event, the contaminated material not separated as clean coarse material is converted into a slurry through the input of water to the slurry preparation unit 12 via a recycle water line 14. Preferably, the mass ratio of contaminated material to slurry is the range of about 4–12%. That is, for every pound of slurry, there is 0.04–0.12 pounds of contaminated material.

The slurry is sent to a hydroclone 16 where fine particles (i.e., particles about 10–15 microns in size and referred to herein as "slimes") are separated from the slurry. Thus, the initial slurry is divided into the primary sand slurry and a slimes slurry. The slimes slurry is then fed to a first stirred contactor 18, while the sand slurry is directed to an attrition scrubber 20. The attrition scrubber 20 comprises a tank having one or more agitators which vigorously agitate the contents of the tank. Each agitator typically comprises two impellers on a rotating shaft. The impellers on each shaft are positioned with opposite pitches so that the respective flows impact one another. This action causes much mixing and surface abrasion between particles which liberates the contaminants from the contaminated material. The contaminants then exist largely as emulsions in the wash water. The sand slurry is next fed to a second stirred contactor 22. Both stirred contactors 18, 22 comprise a tank having a stirrer which stirs the contents of the tank. The stirred contactors 18, 22 are similar to the attrition scrubber 20 but do not agitate their contents as vigorously. The stirred contactors 18, 22 simply mix their contents to encourage diffusional mass transfer.

Figure 2:
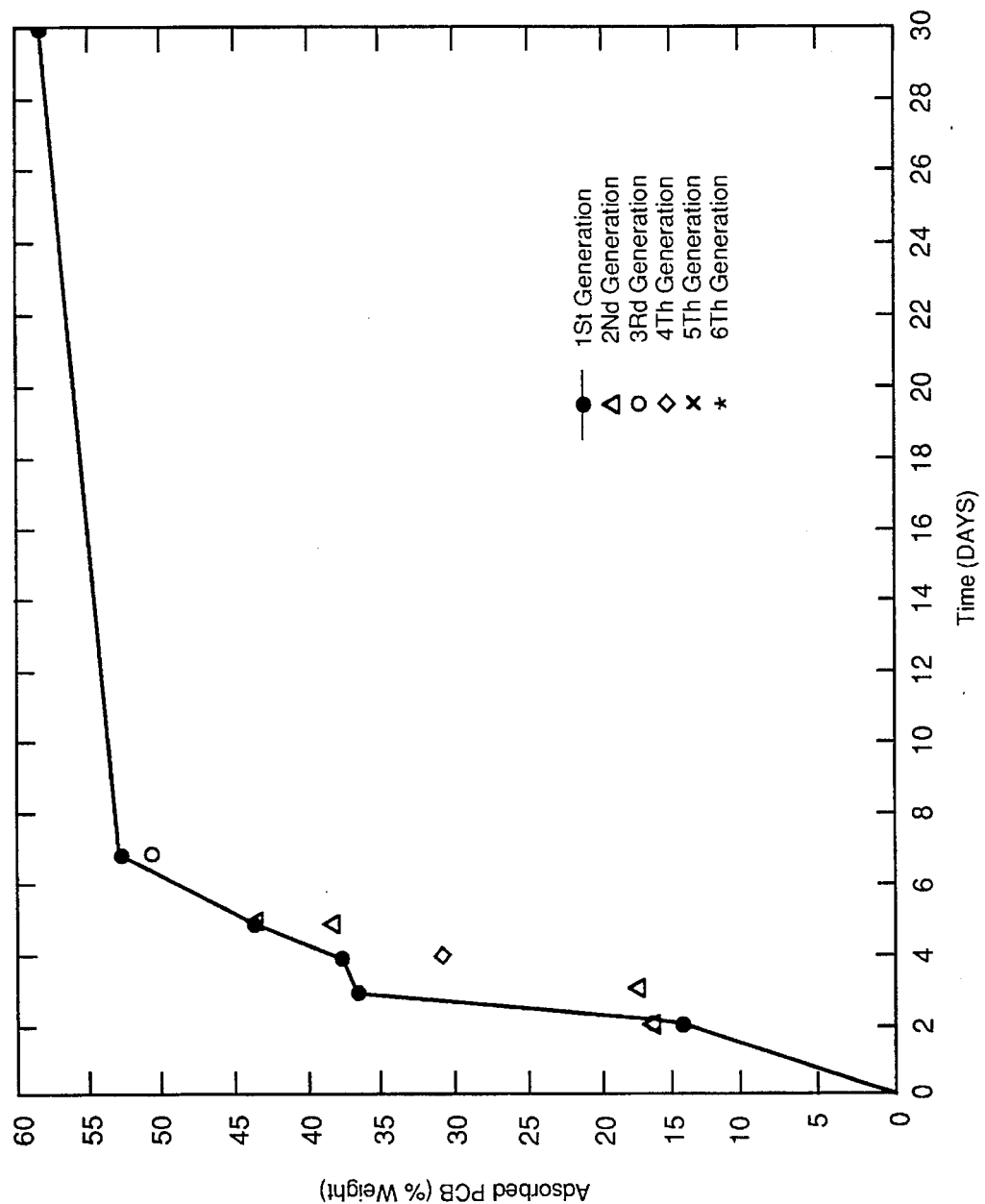
FIG. 2 is a graph plotting PCB adsorbed on nitrile-butadiene particles against time for a number of generations.

The present invention uses a solid polymeric sorbent in particulate form to adsorb contaminants. Specifically, the various fractions of the contaminated material are sequentially exposed to a quantity of polymeric sorbent particles. The polymeric sorbent particles should be larger than the soil particles so as to facilitate recovery of the particles after contaminant adsorption and are preferably sized to pass through no smaller than a 6 mesh screen (Tyler equivalent). Rubber materials are preferred because such materials are, in general, good oil adsorbers and less susceptible to attrition than mineral sorbents because they are more compliant. One preferred material for the polymeric sorbent is nitrile-butadiene rubber, particularly when removing PCBs. Nitrile-butadiene rubber has been found to adsorb up to 63% of its dry weight in pure PCBs (Congener 1242) with no swelling effects. In addition, while nitrile-butadiene rubber adsorbs large amounts of PCBs, it adsorbs only negligible amounts of other oils. Therefore, it is very efficient at collecting PCBs. Nitrile-butadiene rubber is also easily regenerated at relatively low temperatures. In fact, nitrile-butadiene rubber has been found to be able to withstand repeated thermal regenerations without loss of adsorption characteristics or mechanical properties. This is shown in FIG. 2 which shows the results of an experiment wherein nitrile-butadiene particles were exposed to PCB contaminated material over a number of regeneration cycles. As can been seen from the graph, the nitrile-butadiene particles did not lose their adsorption characteristics over six regenerations. These experimental results are also shown numerically in Table 1.

TABLE 1

| TIME (Days) | ADSORBED PCB (BY PERCENT WEIGHT) | | | | | |
| --- | --- | --- | --- | --- | --- | --- |
| | 1st generation | 2nd generation | 3rd generation | 4th generation | 5th generation | 6th generation |
| 2 | 15 | 17 | 17 | — | — | 17.5 |
| 3 | 37.5 | 18 | — | — | — | — |
| 4 | 38 | — | — | 31.3 | — | — |
| 5 | 43.75 | 39 | — | — | 43.75 | — |
| 6 | — | — | — | — | — | — |
| 7 | 52 | — | 51 | — | — | — |
| 30 | 59 | 63 | — | — | — | — |

TABLE 1

In operation, the polymeric sorbent particles are first exposed to the slimes slurry in the first stirred contactor 18. Polymeric sorbent particles are added to the first stirred contactor 18 in an amount such that the mass ratio of sorbent particles to the contaminated material in the slurry is the range of about 2–100%, preferably 3–10%. This mixture is stirred for a time sufficient for the sorbent particles to adsorb contaminants in the slimes slurry. This stirring time will typically be about 15–60 minutes depending on factors which influence diffusional mass transfer including soil contaminant concentration, differences in soil and sorbent particle sizes, and adequate mixing.

After this process is completed, the mixture of the slimes slurry and the sorbent particles is directed to a first screen 24 which separates the sorbent particles from the slimes slurry. The clean slimes slurry is fed to a conventional dewatering system 26 via a line 28. The separated sorbent particles are delivered to the second stirred contactor 22 for contact with the sand slurry. The sand slurry and the sorbent particles are stirred for a time sufficient to adsorb the emulsified contaminants in the sand slurry, typically about 15–60 minutes depending on the factors discussed above.

Next, the sand slurry and the sorbent particles are sent to a second screen 30 which separates the polymeric sorbent particles from the sand slurry. From here, the sand slurry is fed to a flotation cell 32, and the sorbent particles are sent to a third stirred contactor 34. The flotation cell 32 recovers any remaining emulsion from the wash water and provides clean tailings. In this operation, air or other gas bubbles are introduced into the flotation cell 32. The liberated contaminants in the wash water, which would rather attach to an air/water interface than stay in suspension, attach to the bubbles and rise to the surface and form a froth. Some fine soil particles, called "fines," contained in the sand slurry will also be carried to the froth. Thus, the remaining contaminants (if any) and fines are contained in the froth, while the now decontaminated sand remains in the wash water in the lower portion of the flotation cell 32.

The froth, which is also referred to as the concentrate, is skimmed off and fed to the third stirred contactor 34 where it is exposed to the polymeric sorbent particles removed from the second screen 30. Here, the sorbent particles are contacted with the concentrate for a time sufficient to adsorb the emulsified contaminants in the concentrate which is about 15–60 minutes depending on the factors discussed above. After this process is completed, the concentrate and sorbent particles are fed to a third screen 36 where the sorbent particles are separated from the fines. The clean fines are directed to the line 28 where they are combined with the clean slimes slurry to form a fines slurry which is delivered to the dewatering system 26.

Meanwhile, the clean tails emitted from the flotation cell 32 are fed to a conventional rinsing system 38. Here, the tails are rinsed by an input of water from a rinse water line 40, drained and screened. The drained water is sent along the recycle water line 14 for eventual return to the slurry preparation unit 12 to begin another cycle. Clean sand is discharged from the rinsing system 38 as an output of the soil washing system. The discharged sand makes up the bulk of the solid output from the soil washing system of the present invention.

A portion of the water carried in the recycle water line 14 is diverted by a first water bypass valve 42 to a conventional belt filter 44 which also receives the output of the dewatering system 26. The dewatering system 26 receives the clean fines slurry via the line 28 and clarifies and thickens this slurry in conventional fashion. Overflow water from this process is returned to the recycle water line 14 by a line 46. The thickened fines are then filtered in the belt filter 44 with the water diverted by the first water bypass valve 42. The clean fines are discharged from the belt filter 44 as an output of the soil washing system. The filter water is returned to the recycle water line 14 via a line 48.

A regeneration unit 50 is provided for regenerating the polymeric sorbent particles separated from the froth or concentrate by the third screen 36. The regeneration unit 50 desorbs the contaminants from the sorbent particles which are then recycled back for another sorption cycle. The polymeric sorbent particles may not become saturated with contaminant in a single cycle. Thus, regeneration may not be necessary after each cycle. To avoid unnecessary regeneration, a bypass valve 52 is located between the third screen 36 and the regeneration unit 50. The bypass valve 52 directs a portion of the polymeric sorbent particles to the regeneration unit 50 while the remaining sorbent particles are routed directly to a return line 54. Only the sorbent particles directed to the regeneration unit 50 are regenerated each cycle, thereby increasing the overall efficiency of the system. The portion of sorbent particles regenerated each cycle is dependent on the ability of the sorbent particles to adsorb the contaminant or contaminants present.

The regeneration unit 50 preferably employs thermal regeneration. The heating can be produced using microwave heating or other means such as convection or radiation. In this process, the polymeric sorbent particles are exposed to temperatures in the range of about 130–150° C. for approximately 5–10 minutes. This heating regime causes the contaminants in the polymeric sorbent particles to be desorbed. The contaminant gases are then drawn off and burned in an incinerator 56 in a manner known in the art. The desorbed polymeric sorbent particles are allowed to cool and then recycled back to the system via the return line 54.

The sorbent particles in the return line 54 are directed to a washer 58 where they are rinsed to remove any residual soil particles by water diverted from the recycle water line 14 by a second water bypass valve 60. The water not diverted by the second water bypass valve 60 continues in the recycle water line 14 back to the slurry preparation unit 12. Any needed make-up sorbent 62 is added to the system at the washer 58. The water and sorbent particles from the washer 58 are screened by a fourth screen 64; the sorbent particles being returned to the first stirred contactor 18 for another cycle, and the water being directed to the rinse water line 40 for delivery to the rinsing system 38. Make-up water 66 as needed is also added to the rinse water line 40.

The foregoing has described a soil washing system which uses polymeric sorbent particles to enhance removal of contaminants. While specific embodiments of the present invention have been described, it will be apparent to those skilled in the art that various modifications thereto can be made without departing from the spirit and scope of the invention as defined in the appended claims.

What is claimed is:

1. A process for removing a hazardous or toxic contaminant from a contaminated material, the process comprising the steps of:

converting the contaminated material into an initial slurry;

dividing the initial slurry into a sand slurry having said contaminant and a slimes slurry having said contaminant;

agitating the sand slurry;

contacting the slimes slurry during a first time period with a polymeric adsorbent to allow said adsorbent to adsorb said contaminant from said slimes slurry; then separating the polymeric adsorbent from the slimes slurry after said first time period;

adding the polymeric adsorbent separated from the slimes slurry to the sand slurry; then stirring the sand slurry and said separated polymeric adsorbent for a second time period to allow said adsorbent to adsorb said contaminant from said sand slurry; then separating the polymeric adsorbent from the sand slurry after said second time period; then exposing the sand slurry to the action of a flotation cell;

removing concentrate from the flotation cell;

exposing the removed concentrate to the polymeric adsorbent separated from the sand slurry for a third time period to allow said adsorbent to adsorb said contaminant from said concentrate; then separating the polymeric adsorbent from the concentrate after said third time period; and thermally regenerating at least a portion of the polymeric adsorbent separated from the concentrate.

2. The process of claim 1 wherein the mass ratio of the polymeric adsorbent to the contaminated material in the initial slurry is in the range of about 3–10%.

3. The process of claim 1 wherein the contaminant is PCB and the polymeric adsorbent is nitrile-butadiene rubber.

4. The process of claim 3 wherein the polymeric adsorbent is in the form of particles approximately sized to pass through no smaller than a 6 mesh screen.

5. The process of claim 1 wherein the step of dividing the slurry into a sand slurry and a slimes slurry is done by hydrocloning.

6. The process of claim 1 wherein the step of thermally regenerating at least a portion of the polymeric adsorbent comprises exposing said polymeric adsorbant to a temperature in the range of about 130–150° C. for about 5–10 minutes.

* * * * *